United States Patent [19]
Culbertson

[11] Patent Number: 5,987,880
[45] Date of Patent: Nov. 23, 1999

[54] SUPERSONIC ENGINE, MULTI-PORT THRUST REVERSING SYSTEM

[75] Inventor: Christopher C. Culbertson, Irvine, Calif.

[73] Assignee: McDonnell Douglas Corporation, Huntington Beach, Calif.

[21] Appl. No.: 08/889,403

[22] Filed: Jul. 8, 1997

[51] Int. Cl.⁶ .................................................... F02K 3/02
[52] U.S. Cl. ..................... 60/204; 60/226.2; 239/265.37; 244/110 B
[58] Field of Search ................................... 60/204, 226.2, 60/262, 271; 239/127.3, 265.37; 244/110 B

[56] References Cited

U.S. PATENT DOCUMENTS

| | | |
|---|---|---|
| 3,248,878 | 5/1966 | Clark et al. . |
| 3,262,270 | 7/1966 | Beavers . |
| 3,601,992 | 8/1971 | Maison . |
| 3,603,090 | 9/1971 | Billinger et al. . |
| 3,736,750 | 6/1973 | Britt . |
| 3,739,582 | 6/1973 | Maison . |
| 3,759,467 | 9/1973 | Roudil . |
| 3,764,096 | 10/1973 | Wright . |
| 3,831,376 | 8/1974 | Moorehead . |
| 3,837,411 | 9/1974 | Nash et al. . |
| 3,841,091 | 10/1974 | Sargisson et al. . |
| 3,943,707 | 3/1976 | Nash . |
| 4,030,291 | 6/1977 | Sargisson . |
| 4,145,877 | 3/1979 | Montgomery . |
| 4,147,028 | 4/1979 | Rodgers . |
| 4,183,478 | 1/1980 | Rudolph . |
| 4,184,798 | 1/1980 | Dickenson . |
| 4,353,516 | 10/1982 | Soligny et al. . |
| 4,373,328 | 2/1983 | Jones . |
| 4,805,401 | 2/1989 | Thayer et al. ........................ 60/226.2 |
| 4,998,409 | 3/1991 | Mutch . |
| 5,228,641 | 7/1993 | Remlaoui . |
| 5,347,808 | 9/1994 | Standish et al. . |
| 5,507,143 | 4/1996 | Luttgeharm et al. . |
| 5,575,147 | 11/1996 | Nikkanen . |
| 5,598,701 | 2/1997 | Newton . |
| 5,666,802 | 9/1997 | Lair ....................................... 60/226.2 |

FOREIGN PATENT DOCUMENTS

| | | | |
|---|---|---|---|
| 76 19695 | 7/1977 | France .................................. 60/226.2 |

*Primary Examiner*—Charles G. Freay
*Attorney, Agent, or Firm*—Harness Dickey & Pierce P.L.C.

[57] ABSTRACT

A thrust reverser system for a gas turbine engine 10 of the type which includes an outer nacelle 16 spaced apart from a core engine to define an annular bypass duct 32 therebetween and having a fan 22 disposed in an inlet for providing forced air to the bypass duct 32 and core engine. The thrust reverser system includes at least one passageway 40 through the nacelle 16 having a plurality of vanes 42 disposed therein. An internal reverser door 44 is disposed to be movable between a closed position wherein the internal reverser door 44 generally covers the at least one passageway 40 and an open position so as to allow at least a portion of air flow in the bypass duct 32 to pass through the at least one passageway 40. At least one mixer lobe 54 is disposed upstream of the at least one passageway 40. The at least one mixer lobe 54 is rotatable from a first position for mixing air from the bypass duct 32 into a core stream airflow and a second position corresponding with the open position of the internal reverser door 44 for directing air from the bypass duct 32 through the at least one passageway 40 for generating a reverser thrust.

16 Claims, 3 Drawing Sheets

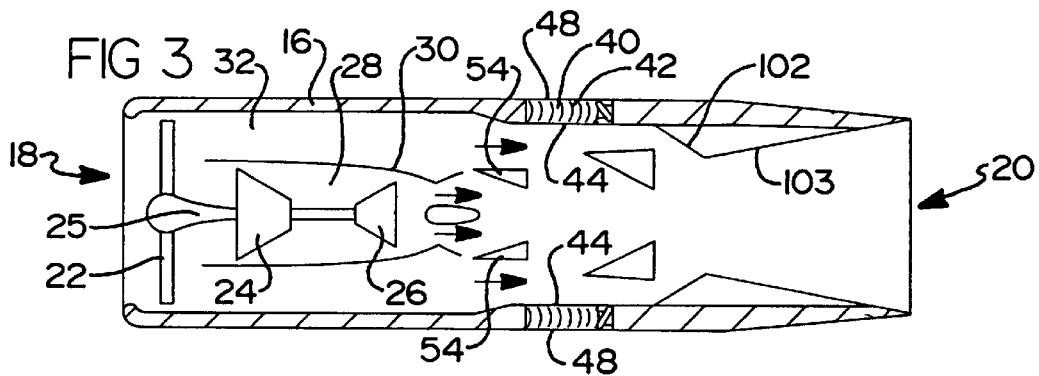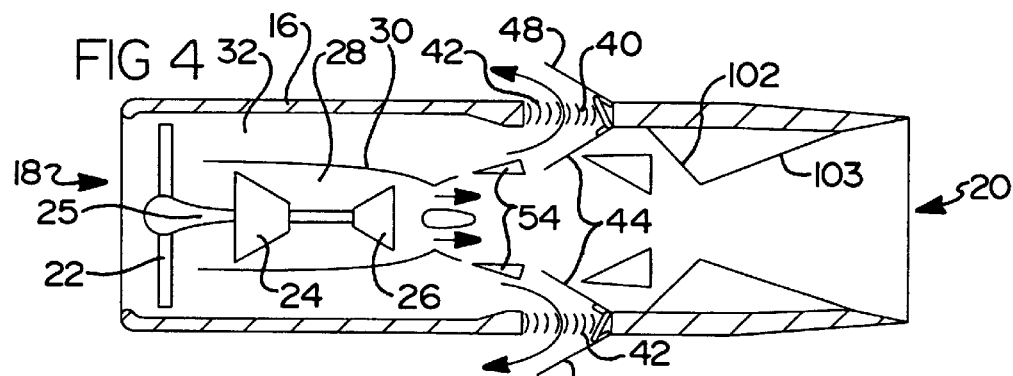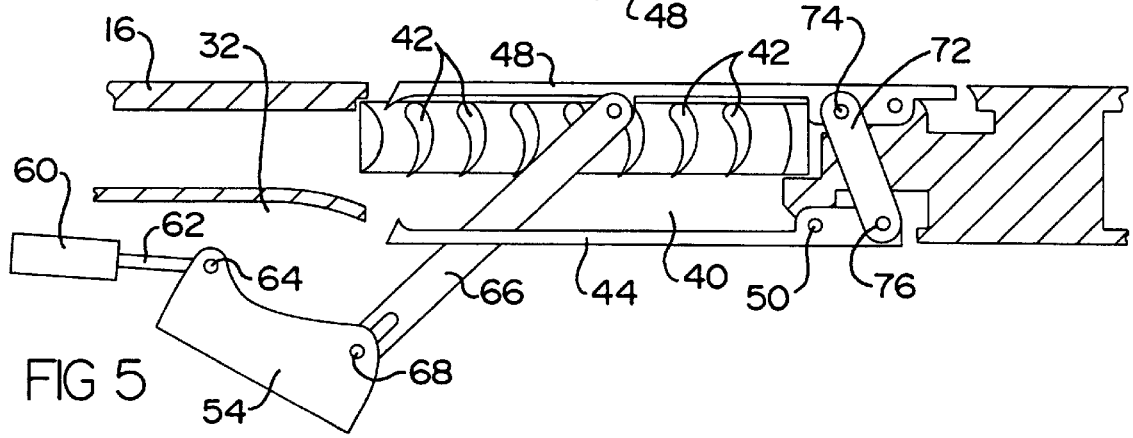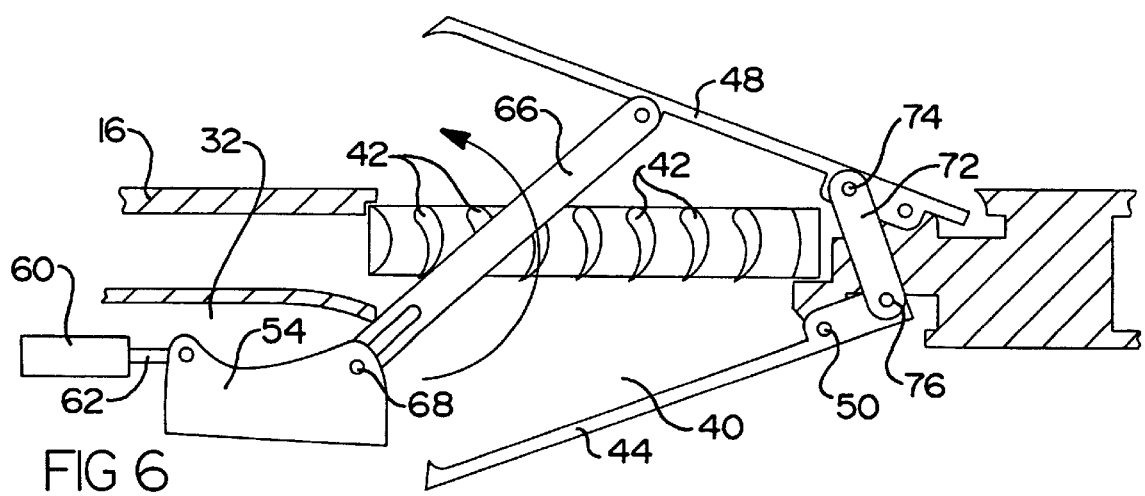

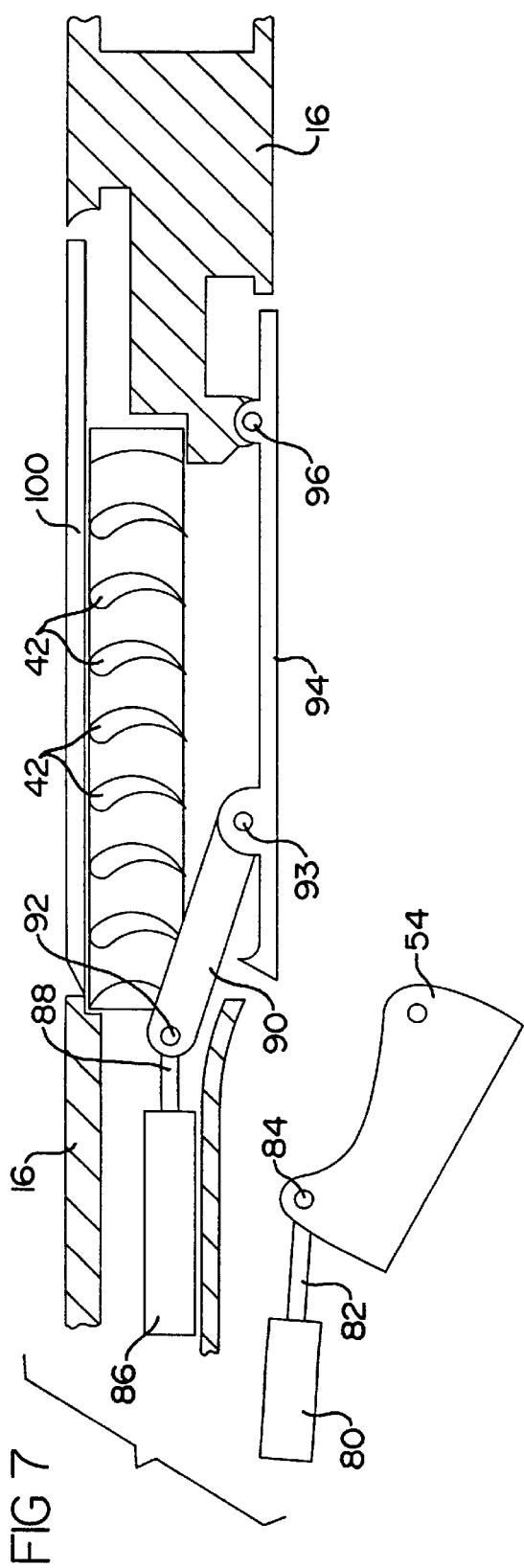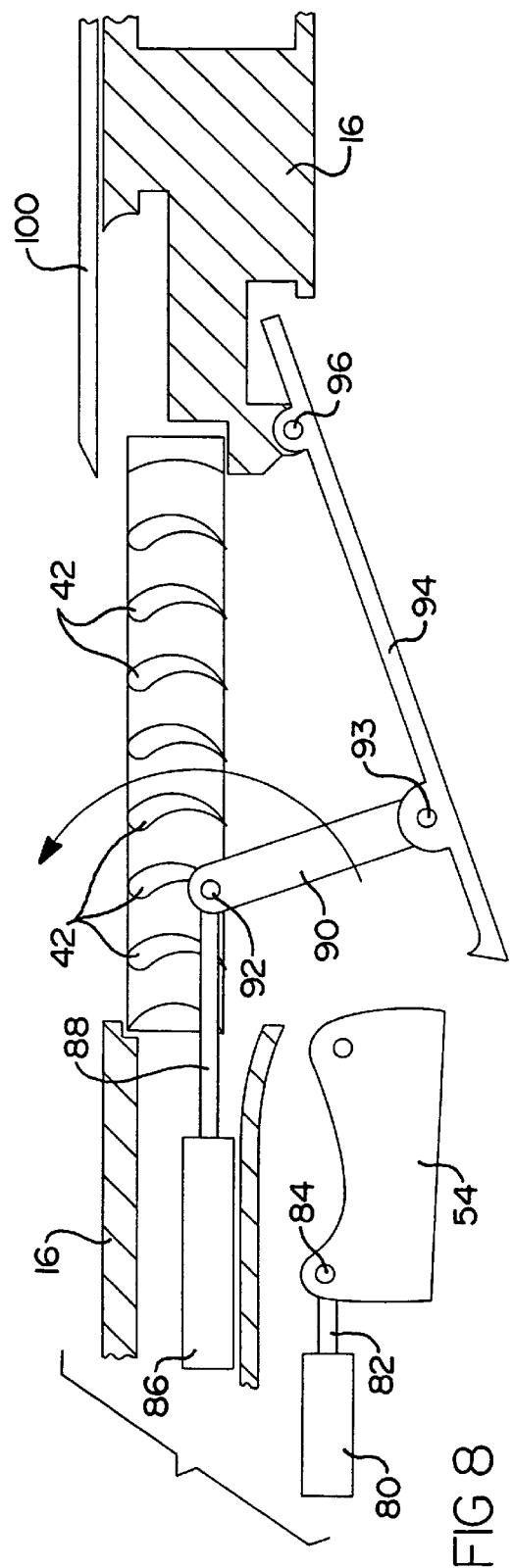

SUPERSONIC ENGINE, MULTI-PORT THRUST REVERSING SYSTEM

BACKGROUND OF THE INVENTION

1. Technical Field

The present invention relates to gas turbine engines, commonly called jet engines, and more particularly to a thrust reverser system for use with a gas turbine engine.

2. Background Art

One reverser systems are generally known in the art for assisting in braking an aircraft during landing or in the event of an aborted takeoff attempt. Typical thrust reverser systems redirect a portion of the gases passing through the gas turbine engine in a forward direction, producing a force which acts on the aircraft opposing the direction of motion of the aircraft.

One thrust reverser purpose is to help an airplane decelerate on a runway which has been contaminated by ice, snow, or water. The incorporation of a traditional thrust reversing system on an engine designed to cruise at supersonic speeds can negatively impact the overall efficiency of the aircraft.

Currently, two common methods are utilized to provide reverse thrust in an airplane having a gas turbine engine, the "bucket" reverser and the "convergent blocker" reverser. Exemplary reverser bucket or blocker-type reverser systems are disclosed in U.S. Pat. Nos. 3,759,467 issued to Roudill; 3,837,411 issued to Nash; 3,943,707 issued to Nash; 4,373,328 issued Jones; 4,183,478 issued Rudolph; 4,185,798 issued to Dickinson; 4,353,516 issued to Soligny et al; and 5,507,143 issued to Luttgeharm. Exemplary "convergent blocker" reverser systems are disclosed in U.S. Pat. Nos. 3,262,270 issued Beavers; 3,603,090 issued to Billinger et al; 4,030,291 issued to Sargisson; 4,145,877 issued to Montgomery; 4,147,28 issued to Rodgers; 4,998,028 issued to Mutch; 5,228,641 issued to Remlaoui; and 5,575,147 issued to Nikkanen. Both the "bucket" reverser and the "convergent blocker" reverser typically involve the reversing of air from the high-temperature core stream of the engine. This requires the reverser components to be built from heavy and/or expensive heat-resistant materials which can tolerate the extreme temperatures of this environment.

In addition to requiring high-temperature materials for the thrust reverser components, these systems typically involve incorporation of high temperature materials in adjacent plane structures. These systems generally also include structure to help prevent the hot gases which leave the reverser from being undesirably reingested by the engine.

Convergent blocker type reversers often include convergent flaps to rotate to completely block the airflow and prevent it from escaping through the rear of the nozzle. This increases both the nozzle actuators stroke length and the total hydraulic power required to operate the nozzle.

Furthermore, the previously mentioned reverser systems are not easily integrated into a supersonic, variable-area nozzle. The length and complexity of the nozzle must be increased to accommodate the reverser system. This adds weight and may increase the external nozzle boattail angles, which may cause an increased drag on the engine.

Also of possible interest are U.S. Pat. Nos. 3,736,750 issued to Britt; and 3,841,091 issued to Sargisson et al.

3. DISCLOSURE OF INVENTION

Accordingly, the present invention provides a thrust reverser system for a gas turbine engine which does not require the use of special heat resistant materials.

The present invention provides a thrust reverser system which can be used with a supersonic engine without sacrificing noise reduction and weight reduction parameters.

The present invention provides a thrust reverser system for use with a gas turbine engine which does not cause a stall of the fan blades when deployed.

These and other advantages are obtained by providing a thrust reverser system for a gas turbine engine of the type which includes an outer nacelle spaced apart from a core engine to define an annular bypass duct therebetween and having a fan disposed in the inlet for directing forced air to the bypass duct and core engine. The thrust reverser system includes a structure defining at least one passageway through the nacelle having a plurality of vanes disposed therein. An internal reverser door is disposed on an interior side of said at least one passageway and is movable between a closed position wherein the internal reverser door generally covers the at least one passageway and an open position so as to allow at least a portion of airflow in the bypass duct to pass through the at least one passageway. At least one mixer lobe is disposed forward of the at least one passageway and is rotatable from a first position for mixing air from the bypass duct into a core stream airflow and a second position corresponding with the open position of the internal reverser door for directing air from the bypass duct through the at least one passageway for generating a reverse thrust.

An actuator is provided for moving the at least one mixer lobe between the first and second positions. Further, a linkage assembly is connected between the actuator and the internal reverser door for moving the internal reverser door to the open position when the at least one mixing lobe is moved to the second position. The linkage assembly includes a first link attached to the at least one mixer lobe and to an external reverser door. A second link is attached to the external reverser door and the internal reverser door. The actuator causes movement of the at least one mixer lobe and a corresponding movement of the internal and external reverser doors via the linkage assembly.

Accordingly, the present invention provides a device which aids in braking an aircraft during landing or in the event of an aborted takeoff attempt. The system allows thrust reverser deployment and high levels of forward thrust without causing a stall of the engine fan blades. The system also reverses only a portion of the fan airflow, but greatly reduces the thrust of the remaining fan airflow and the core airflow through modulation of the nozzle throat and exit areas.

The system also utilizes the variable-geometry mixer lobe actuators to drive the thrust reverser system, thereby eliminating nozzle complexity and reducing system weight. The system also allows more compact packaging of nozzle components than other systems proposed for an engine of this type. The compact packaging achieved by the present invention greatly reduces aircraft drag.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

4. BRIEF DESCRIPTION OF DRAWINGS

The present invention will become more fully understood from the detailed description and the accompanying drawings, wherein:

FIG. 3 is a schematic view of the gas turbine engine with the thrust reverser system according to the present invention in an inoperative mode;

FIG. 4 is a schematic of the gas turbine engine with the thrust reverser system according to the present invention in an operational mode;

FIG. 5 is a detailed cross-sectional view of the thrust reverser system according to the present invention in an inoperative mode;

FIG. 6 is a detailed cross-sectional view of the thrust reverser system according to the present invention in the operating mode;

FIG. 7 is a detailed cross-sectional view of a thrust reverser system according to an embodiment of the present invention; and FIG. 8 is a detailed cross-sectional view of the thrust reverser system as shown in FIG. 7 with the thrust reverser system in the operating mode.

5. DETAILED DESCRIPTION OF THE INVENTION

Figure 1:
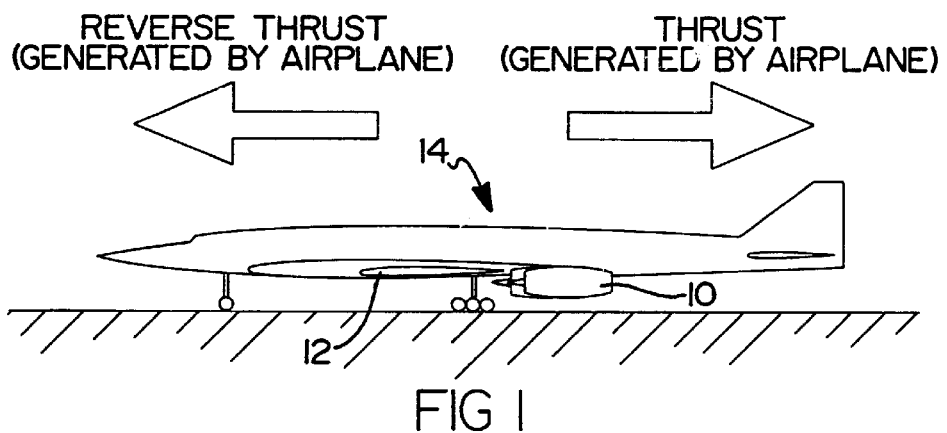
FIG. 1 shows an aircraft having a jet engine and illustrating the forward and reverse thrust generated by the airplane.
Figure 2:
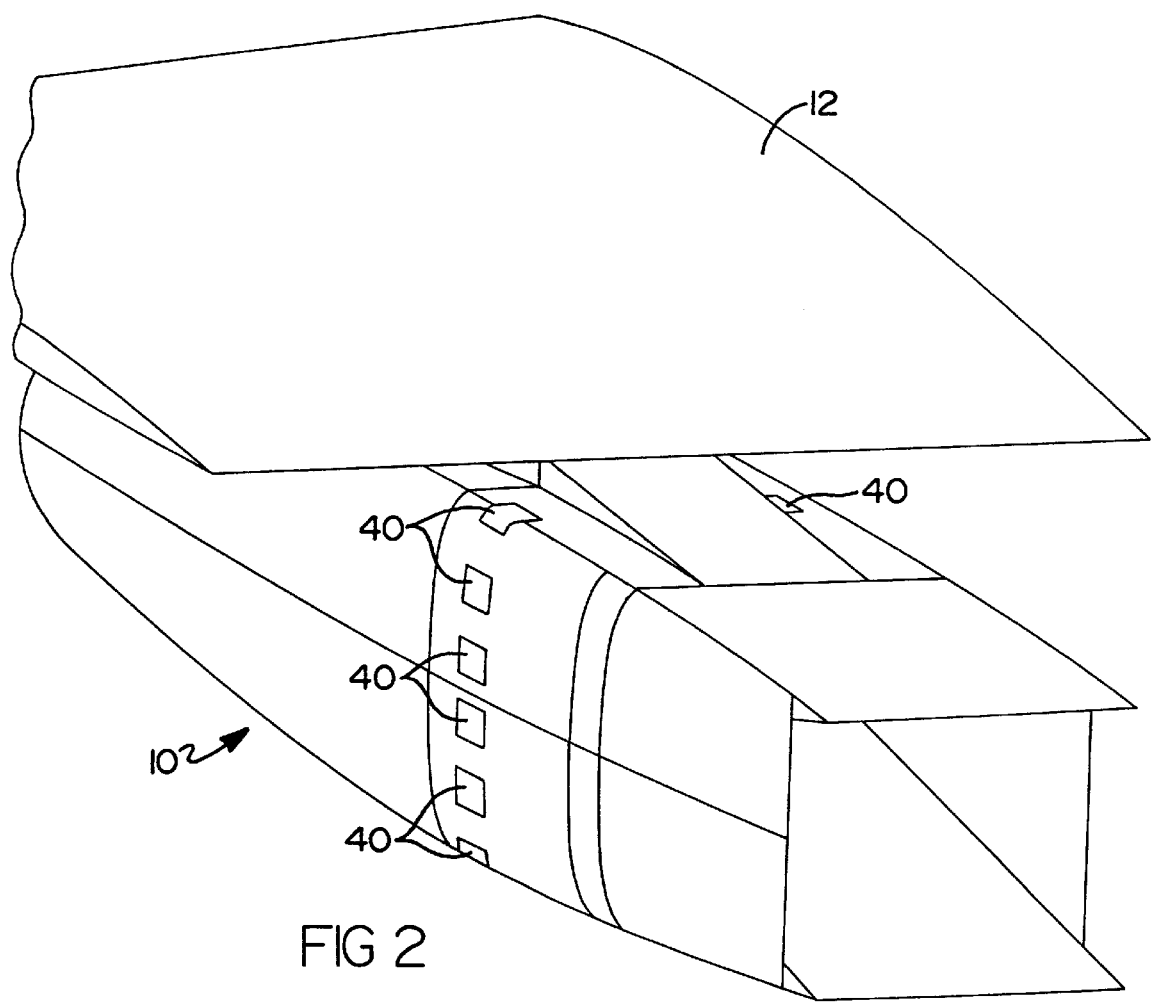
FIG. 2 is a perspective view of a gas turbine engine showing the location of the reverser ports disposed in the outer nacelle of the engine which is attached to a wing.

With reference to FIGS. 1–6, an embodiment of the present invention will now be described. As shown in FIGS. 1 and 2, a gas turbine engine 10 is typically attached to a wing 12 of an aircraft 14. With reference to FIGS. 3 and 4, the gas turbine engine 10 includes an outer nacelle 16 having an inlet 18 and an outlet 20. A fan 22 is disposed in the inlet 18 and is rotatably connected to a compressor 24 via a shaft 25. Compressor 24 is also connected to a turbine 26. A combuster chamber 28 is disposed between compressor 24 and turbine 26. The compressor 24, turbine 26, and combuster chamber 28 are all disposed within a core cowl 30. A fan air bypass duct 32 is disposed between core cowl 30 and outer nacelle 16. The thrust reverser system includes a structure defining a plurality of ports or passageways 40 disposed through the outer nacelle 16. A plurality of reverser turning vanes 42 are disposed in the ports 40. An internal reverser door 44 is disposed on the internal side of the vanes 42. An internal reverser door 44 is pivotally attached to the outer nacelle 16 by pivot a pin 46. An external reverser door 48 is disposed on the exterior side of the vanes the 42. The external reverser door 48 is pivotally attached to the outer nacelle 16 by a pivot pin 50.

A plurality of rotating mixer lobes 54 are disposed at a rear portion of the core cowl 30 in a location forward of the ports 40. The rotating mixer lobes 54 are rotatable from a first position (as shown in FIGS. 3 and 5) for mixing air from the fan air bypass duct 32 into a core steam airflow. The mixer lobes 54 are rotatable to a second position (as shown in FIGS. 4 and 6) corresponding with an open position of the internal reverser door 44, for directing air from the fan air bypass duct 32 through the reverser ports 40 for generating a reverse thrust. According to one embodiment, the mixer lobes 54 are attached to a dual-purpose actuator 60 via an actuator arm 62 and a connector pin 64. A first link arm 66 is connected to the rotating mixer lobes 54 by a connector pin 68, while a second end of the first link arm 66 is connected to an intermediate portion of the external reverser door 48 by a connector pin 70. A second link arm 72 is provided having a first end attached to the external reverser door 48 by a pivot pin 74. A second end of the second link arm 72 is attached to the internal reverser door 44 by a connector pin 76. The linkage assembly is provided such that rotation of the mixer lobes 54 caused by the dual-purpose actuator 60 causes a corresponding movement of the internal and external reverser doors 44, 48. Accordingly, when the internal and external reverser doors 44, 48 are pivoted to an open position as shown in FIGS. 4 and 6, the rotating mixer lobes 54 are also pivoted in order to direct a portion of the cooler fan airflow from the bypass duct 32 through the ports 40. Accordingly, the system utilizes the variable-geometry mixer lobe actuators to drive the thrust reverser system, thereby eliminating nozzle complexity and reducing system weight.

With reference to FIGS. 7 and 8, another embodiment of the present invention will be described, wherein like reference numerals are utilized to represent common elements as discussed with reference to FIGS. 1–6. According to this embodiment, a mixer lobe actuator 80 can be utilized for rotating the mixer lobes 54. The mixer lobe actuator 80 includes an actuator arm 82 which is attached to the rotating mixer lobes 54 by a connector pin 84. A separate reverser system actuator 86 is provided with an actuator arm 88 which is connected to a link arm 90 by a connector pin 92. The link arm 90 is attached via a connector pin 93 to an internal reverser door 94 which is pivotally attached to the outer nacelle 16 by a pivot pin 96. Thus, separate actuators are utilized for pivoting the rotating mixer lobes 54 and for opening the internal reverser door 94 for the reverse thrust mode. In addition, it should also be noted that the external reverser door 100 can be designed to be translated in a rearward direction in order to open the port 40 as shown in FIG. 8.

As shown in FIG. 2 the reverser ports 40 can be disposed radially around the outer nacelle. FIG. 2 shows the preferred radial locations available for use as reverser ports. If additional reverse thrust is necessary, the fixed mixer lobes may be used as the reverser chutes, effectively doubling the amount of reverser thrust available. In order to increase the amount of air forced through the reverser port 40, side strakes (not shown), which prevent the fan airflow from escaping into the main nozzle airstream, may be installed. Overall reversing efficiency may also be increased by reducing the nozzle throat area. This is accomplished by moving the convergent flaps 102 and the divergent flaps 103 toward the nozzle centerline as shown in FIG. 4. The thrust produced by the remaining engine airflow passing through the nozzle would be greatly reduced by increasing the nozzle exit area to its maximum value.

Instead of locating a large reverser port, as is done in a subsonic transport engine installation, several small ports 40 are utilized according to the present invention around the engine perimeter. To compensate for the absence of a core cowl in the location of the ports 40, the transition doors 44; 94 mate with the rotating mixer lobes 54 as shown in FIGS. 4, 6, and 8. The flow will then pass through a set of turning vanes 42 and can be further redirected forward by an external reverser door 48 to produce a reverse thrust. The system is powered by the actuator used to position the rotating mixer lobes 54 as shown in FIGS. 5 and 6, or, alternatively, by an independent actuation system as shown in FIGS. 7 and 8. Also shown in FIGS. 7 and 8 is an alternate type of external door which translates aft instead of pivoting outward.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A thrust reverser system for a gas turbine engine of the type which includes an outer nacelle spaced apart from a core engine to define an annular bypass duct therebetween and having a fan disposed in an inlet for directing forced air to the bypass duct and core engine, said thrust reverser system comprising:

a structure defining at least one passageway through the nacelle, said at least one passageway having a plurality of vanes disposed therein;

an internal reverser door disposed on an interior side of said at least one passageway and movable between a closed position wherein said internal reverser door generally covers said at least one passageway and an open position so as to allow at least a portion of air flow in said bypass duct to pass through said at least one passageway; and at least one mixer lobe disposed upstream of said at least one passageway, said at least one mixer lobe being rotatable from a first position for mixing air from said bypass duct into a core stream airflow and a second position corresponding with said open position of said internal reverser door for directing air from said bypass duct through said at least one passageway for generating a reverse thrust.

2. The thrust reverser system according to claim 1, further comprising an actuator for moving said at least one mixer lobe between said first and second positions.

3. The thrust reverser system according to claim 2, further comprising a linkage assembly connected between said actuator and said internal reverser door for moving said internal reverser door to said open position when said at least one mixing lobe is moved to said second position.

4. The thrust reverser system according to claim 1, further comprising an external reverser door disposed on an exterior side of said at least one passageway.

5. The thrust reverser system according to claim 3, wherein said linkage assembly includes a first link attached to said at least one mixer lobe and to said external reverser door and a second link attached to said external reverser door and said internal reverser door, wherein said actuator causes movement of said at least one mixer lobe and a corresponding movement of said internal and external reverser doors.

6. The thrust reverser system according to claim 3, further comprising a second actuator for moving said internal reverser door between said closed and open positions.

7. The thrust reverser system according to claim 1, wherein said internal reverser door is pivotally attached to said outer nacelle.

8. A gas turbine engine, comprising:

a core engine including compressor, a combustion chamber and a turbine disposed within a core cowl;

an outer nacelle spaced apart from said core cowl to defame an annular bypass duct therebetween and having a fan disposed in an inlet for directing forced air to the bypass duct and core engine;

at least one passageway through the nacelle having a plurality of vanes disposed therein;

an internal reverser door disposed to be movable between a closed position wherein said internal reverser door generally covers said at least one passageway and an open position so as to allow at least a portion of air flow in said bypass duct to pass through said at least one passageway; and at least one mixer lobe disposed upstream of said at least one passageway, said at least one mixer lobe being rotatable from a first position for mixing air from said bypass duct into a core stream airflow and a second position corresponding with said open position of said internal reverser door for directing air from said bypass duct through said at least one passageway for generating a reverse thrust.

9. The gas turbine engine according to claim 8, further comprising an actuator for moving said at least one mixer lobe between said first and second positions.

10. The gas turbine engine according to claim 9, further comprising a linkage assembly connected between said actuator and said internal reverser door for moving said internal reverser door to said open position when said at least one mixing lobe is moved to said second position.

11. The gas turbine engine according to claim 10, further comprising an external reverser door disposed on an exterior side of said at least one passageway.

12. The gas turbine engine according to claim 11, wherein said linkage assembly includes a first link attached to said at least one mixer lobe and to said external reverser door and a second link attached to said external reverser door and said internal reverser door, wherein said actuator causes movement of said at least one mixer lobe and a corresponding movement of said internal and external reverser doors.

13. The gas turbine engine according to claim 9, further comprising a second actuator for moving said internal reverser door between said closed and open positions.

14. The gas turbine engine according to claim 8, wherein said internal reverser door is pivotally attached to said outer nacelle.

15. The gas turbine engine according to claim 8, further comprising convergent and divergent flaps within an outlet portion of said outer nacelle.

16. A method of generating a reverse thrust from an aircraft engine of the type which includes an outer nacelle spaced apart from a core engine to define an annular bypass duct therebetween and having a fan disposed in an inlet for directing forced air to the bypass duct and core engine, comprising the steps of:

providing at least one passageway through the outer nacelle;

mounting a plurality of vanes in said at least one passageway;

directing air from said annular bypass duct through said at least one passageway by pivoting at least one mixer lobe disposed upstream of said at least one passageway for directing air from said bypass duct through said at least one passageway for generating a reverse thrust.

* * * * *

UNITED STATES PATENT AND TRADEMARK OFFICE
CERTIFICATE OF CORRECTION

PATENT NO. : 5,987,880
DATED : November 23, 1999
INVENTOR(S) : Christopher C. Culbertson It is certified that error appears in the above-identified patent and that said Letters Patent is hereby corrected as shown below:

Column 1, Line 10, "systems" should be --system--.

Column 1, Line 30, after first occurrence of "issued" insert -- to --.

Column 1, Line 30, after second occurrence of "issued" insert -- to --.

Column 1, Line 34, after first occurrence of "issued" insert -- to --.

Column 1, Line 36, "4,147,28" should be -- 4,147,028 --.

Column 3, Line 48, after "16" "by pivot a pin 46" should be -- by a pivot pin 46 --.

Column 3, Line 49, before "42" delete "the".

Column 3, Line 56, "steam" should be -- stream --.

Column 5, Claim 8, Line 60, "defame" should be -- define --.

Signed and Sealed this

Twenty-fifth Day of July, 2000

Attest:

Q. TODD DICKINSON

*Attesting Officer*

*Director of Patents and Trademarks*